United States Patent
Chang et al.

(10) Patent No.: US 8,171,226 B2
(45) Date of Patent: May 1, 2012

(54) METHOD AND APPARATUS FOR EXECUTION OF A PROCESS

(75) Inventors: Yuan-Chi Chang, Bayside, NY (US);
Christian A. Lang, New York, NY (US);
John R. Smith, New Hyde Park, NY (US); Ioana R. Stanoi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 12/127,065

(22) Filed: May 27, 2008

(65) Prior Publication Data

US 2008/0222362 A1    Sep. 11, 2008

Related U.S. Application Data

(63) Continuation of application No. 11/415,746, filed on May 1, 2006, now abandoned.

(51) Int. Cl.
*G06F 12/00* (2006.01)

(52) U.S. Cl. ......... 711/133; 711/137; 711/158; 711/213

(58) Field of Classification Search .................. 711/137, 711/133, 158, 213
See application file for complete search history.

(56) References Cited

U.S. PATENT DOCUMENTS

| | | | | |
|---|---|---|---|---|
| 4,965,722 A | * | 10/1990 | Tokuume | 711/106 |
| 2005/0144394 A1 | * | 6/2005 | Komarla et al. | 711/137 |
| 2007/0094462 A1 | * | 4/2007 | Hill et al. | 711/158 |

OTHER PUBLICATIONS

Abiteboul et al., "Active Views for Electronic Commerce," VLDB Proceedings of 25th International Conference on Very Large Databases, pp. 138-149 (Mar. 1998).
Abiteboul et al., "Relational Transducers for Electronic Commerce," Journal of Computer and System Sciences, pp. 236-269 (2000).
Alonso et al , "Exotica/FMDC: Handling Disconnected Clients in a Workflow Management System," Proc. 3rd Int'l Conf on Cooperative Information Systems, Vienna (May 1995).
Georgakopoulos et al , "An Overview of Workflow Management: From Process Modeling to Workflow Automation Infrastructure," Distributed and Parallel Databases, 3(2), pp. 119-153 (Apr. 1995).
Jing et al. "Client-Server Computing in Mobile Environments" ACM Computing Surveys, vol. 31, No. 2, pp. 117-157 (Jun. 1999).
Joseph et al , "Building Reliable Mobile-Aware Applications Using the Rover Toolkit," Wireless Networks, vol. 3, pp. 405-419 (1997).
Joseph et al , "Mobile Computing with the Rover Toolkit," IEEE Transactions on Computers: Special Issue on Mobile Computing (Feb. 1997).

(Continued)

*Primary Examiner* — Midys Rojas
(74) *Attorney, Agent, or Firm* — Ryan, Mason & Lewis, LLP (57) ABSTRACT

Techniques are provided for enabling execution of a process employing a cache Method steps can include obtaining a first probability of accessing a given artifact in a state $S_i$, obtaining a second probability of using a predicate from a current state $S_c$ in the state $S_i$, determining a benefit of prefetching the given artifact using the predicate based on at least the first probability and the second probability, and whether and/or when a cache replacement should be conducted, based at least on the benefit determined.

20 Claims, 4 Drawing Sheets

OTHER PUBLICATIONS

Kumar et al., "Supporting Application-Specific Resolution in an Optimistically Replicated File System," Workshop on Workstation Operating System, pp. 66-70 (1993).

Labrinidis et al., "Update Propagation Strategies for Improving the Quality of Data on the Web," Proceedings of the $27^{th}$ VLDB Conference, pp. 391-400 (2001).

Mohan et al., "Exoctica: A Research Perspective on Workflow Management Systems," Data Engineering Bulletin, 18(1), pp. 19-26 (1995).

Muth et al., "From Centralized Workflow Specification to Distributed Workflow Execution," Journal of Intelligent Information Systems, 10(2), pp. 159-184 (1998).

Muth et al , "What Workflow Technology Can Do for Electronic Commerce," Current Trends in Data Management Technology, pp. 1-13 (1999).

Noble et al., "Agile Application—Aware Adaptation for Mobility," Sixteen ACM Symposium on Operating Systems Principles, pp. 276-287 (1997).

Noble et al., "A Programming Interface for Application—Aware Adaptation in Mobile Computing," Technical Report CS-95-119 (1995).

Terry et al., "Managing Update Conflicts in Bayou, A Weakly Connected Replicated Storage System." Proceedings of the Fifteenth ACM Symposium on Operating System Principles, pp. 172-183 (1995).

Want et al., "An Overview of the ParcTab Ubiquitous Computing Experiment," IEEE Personal Communications, 2(6), pp. 28-33 (Dec. 1995).

Want et al., "The Active Badge Location System," Technical Report 92.1, ORL (1992).

* cited by examiner

METHOD AND APPARATUS FOR EXECUTION OF A PROCESS

CROSS-REFERENCE TO RELATED APPLICATIONS

This application is a continuation of U.S. patent application Ser. No. 11/415,746 filed May 1, 2006, now abandoned incorporated by reference herein.

FIELD OF THE INVENTION

The present invention generally relates to information technology and data processing, and, more particularly, to a method and apparatus for execution of a process.

BACKGROUND OF THE INVENTION

Processes are often used to automate the flow of tasks associated with a service or a product. Recently, mobile devices such as phones, personal digital assistants (PDAs), and hand-held computers have begun supporting various easy to use browser-like navigational features. Users are increasingly able to type in or download more information on their devices With advances in computing and communication capabilities of hand-held devices, we are beginning to see a variety of applications in mobile e-commerce (m-commerce), where some of the commerce functionality is moving from the e-commerce server side to the mobile client side.

Consider a scenario where a buyer is mobile, and wishes to process a buying request. The buyer can be either connected or disconnected at different times during this process, and he can access a local or remote listing of the products, fill out forms, make decisions and submit the buying request to the server. The freshness of data that the buyer sees is the freshness of the data cached locally, if the device is disconnected from the server If the decision regarding when to refresh the cache is left solely to the user (i.e., only the buyer can explicitly refresh local data), then communication is not fully taken advantage of.

In "Active views for electronic commerce", by Serge Abiteboul et al., in Malcolm P. Atkinson et al., editors, VLDB'99, Proceedings of 25th International Conference on Very Large Data Bases, Sep. 7-10, 1999, Edinburgh, Scotland, UK, pages 138-149, Morgan Kaufmann, 1999, a declarative view specification language is proposed to describe the data and activities of participants in an e-commerce application. Users perform a generated set of controlled activities and interact in a distributed manner. It is believed that greater flexibility than that afforded by the Abiteboul et al. language is necessary to support parametric queries in general e-commerce applications In C. Mohan et al, "Exotica: A research perspective of workflow management systems," Data Engineering Bulletin, 18(1):19-26, 1995, for example, the authors concentrate on collaboration issues, for which they propose a decentralized design that allows clients to be disconnected. The focus of the Mohan et al. article is on process execution rather than data access and retrieval It would be desirable to overcome the limitations in previous approaches.

SUMMARY OF THE INVENTION

Principles of the present invention provide techniques for execution of a process An exemplary method (which can be computer-implemented) for enabling execution of a process employing a cache, according to one aspect of the invention, can include steps of obtaining a first probability of accessing a given artifact (e.g., document, table, etc) in a state $S_i$, obtaining a second probability of using a predicate from a current state $S_c$ in the state $S_i$, determining a benefit of prefetching the given artifact using the predicate based on at least the first probability and the second probability, and evaluating whether and/or when a cache replacement should be conducted for the cache. The evaluation can be based at least in part on the benefit determined in the step of determining the benefit In another aspect, an exemplary apparatus for enabling execution of a process can include a process module configured to maintain current state information, a data mining engine coupled to the process module to obtain historical data therefrom, a prediction module coupled to the data mining engine to obtain query data therefrom, and a process interpreter and prefetching engine coupled to the process module and the prediction module to obtain prioritization knowledge therefrom and configured to time and send queries based on the prioritization knowledge.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or more embodiments of the invention may provide one or more beneficial technical effects, such as, for example, facilitating pre-fetching with reduced user-dependence and/or without the periodic interference of a consistency resolution mechanism and subsequent interruption of user actions.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
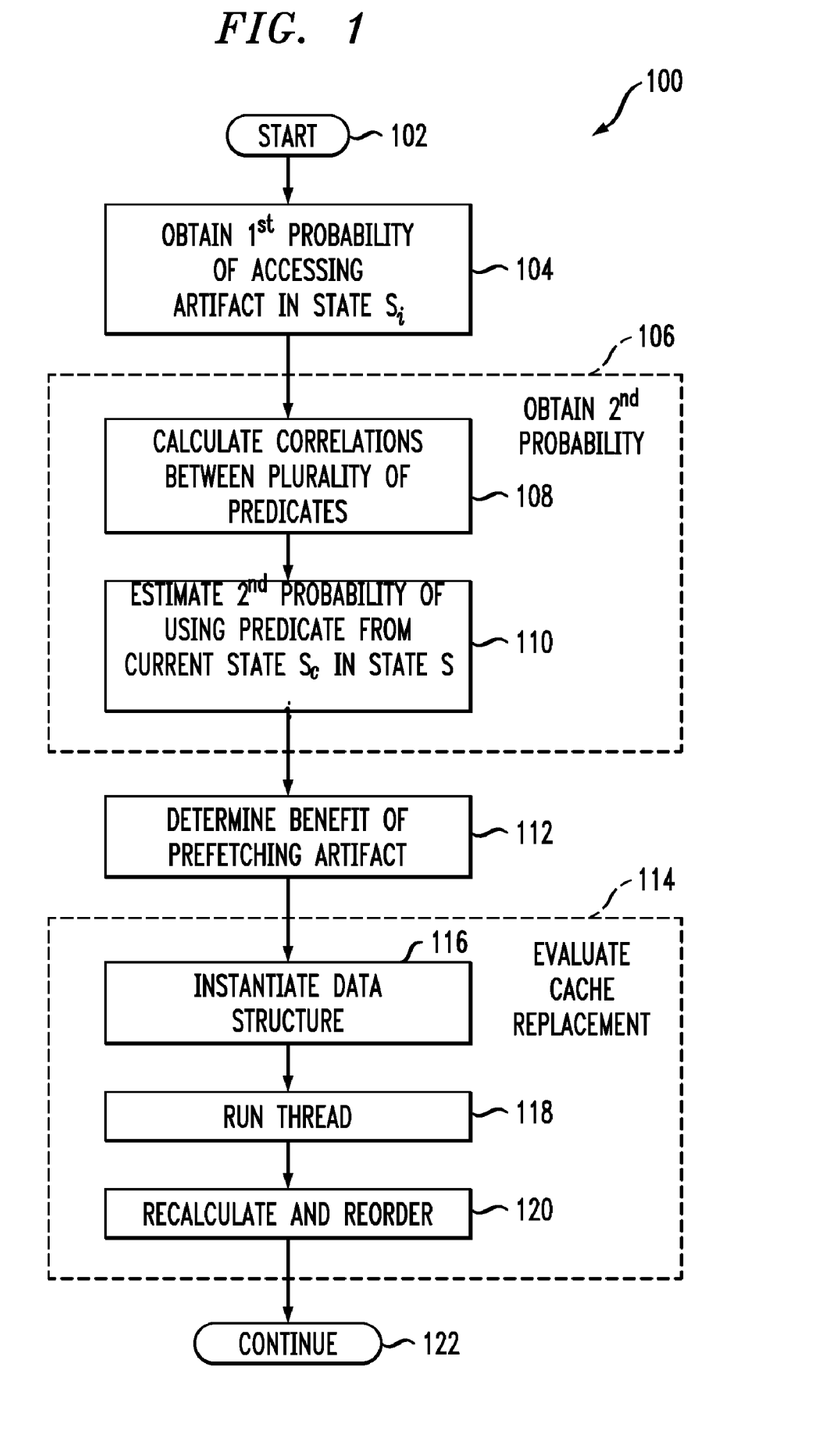
FIG. 1 is a high level flow chart depicting exemplary method steps for enabling execution of a process employing a cache, according to an aspect of the present invention.

FIG. 1 shows a flow chart 100 of exemplary method steps in a method (which can be computer-implemented) for enabling execution of a process employing a cache. After beginning at block 102, step 104 includes obtaining a first probability of accessing a given artifact, such as a document, table, etc., in a state $S_i$. For example, the probability could be that of checking the price of an item, such as a bottle of Vitamin A, once a search had been done for the item per se. Step 106 includes obtaining a second probability of using a predicate from a current state $S_c$ in the state $S_i$. Continuing with the example, this could correspond to the probability of using the predicate "Vitamin A" for doing the next search. Step 106 can optionally be implemented by steps 108 and 110, to be discussed further below Step 112 includes determining a benefit of prefetching the given artifact using the predicate based on at least the first probability and the second probability. Step 114 includes evaluating whether and/or when a cache replacement should be conducted for the cache, based at least in part on the benefit determined in the step of determining the benefit. Step 114 can optionally be implemented by steps 116-120, to be discussed further below. Processing continues at block 122

The obtaining of the first and second probabilities, 104, 106, can be conducted to yield additional artifacts that are candidates for prefetching. The step 112 of determining the benefit of prefetching can include determining additional benefits for the additional artifacts. The evaluating step 114 can be based at least in part on the additional benefits. For example, in addition to prefetching price, there may be a benefit to prefetching ingredients of the Vitamin A capsules. The evaluating step can be additionally or alternatively based at least in part on an approximate time until execution, a retrieval cost, and other pertinent parameters. The cost to retrieve may be related to the size of the artifact The step 104 of obtaining the first probability could include, for example, estimating the first probability based on one or more of knowledge of the current state $S_c$ and knowledge of structure of the process. The step 104 of obtaining the first probability could also include estimating the first probability based on knowledge of past traces of the process.

The step 106 of obtaining the second probability can optionally include calculating correlations between a plurality of predicates in a plurality of different states, as at step 108 The predicate from the current state $S_c$ is one predicate of the plurality of predicates, and the current state $S_c$ and the state $S_i$ are states of the plurality of different states. The calculation can be based on stored past traces of the process. Further, step 110 can also be performed, including estimating the second probability of using the predicate from the current state $S_c$ in the state $S_i$. The estimating can be based on the correlations from the step 108 of calculating the correlations The process can facilitate user-initiated queries, refresh background queries, and prefetch background queries. The step 112 of determining the benefit can include, e.g., assigning priority for incoming ones of the refresh background queries and the prefetch background queries The evaluating step 114 can include, for example, instantiating a data structure, as at 116, that stores the refresh background queries and the prefetch background queries in priority Each of the refresh background queries and the prefetch background queries can have a priority number. At step 118, a thread can be run to select a highest priority one of the refresh background queries and the prefetch background queries. Responsive to receipt of an input query, step 120 can include recalculating the priorities of the refresh background queries and the prefetch background queries and reordering the refresh background queries and the prefetch background queries in accordance with the recalculating. The user-initiated queries can be assigned a higher priority than the refresh background queries and the prefetch background queries. Note that in one or more embodiments, background queries are prioritized, while user queries are typically not delayed, and thus do not need scheduling.

Techniques of one or more embodiments of the present invention can be applied to process improvement, e.g., to prefetching of data needed by a process based, e.g., on process and historical access statistics, and to deciding which data to cache and which priority to assign to the data. As noted above, processes are often used to automate the flow of tasks associated with a service or product We will refer to tasks also as states in a workflow Information is often read and written to local and remote databases by different tasks in the process When real-time processing is a concern, or where unreliable and/or slow connections inhibit access to remote data (such as in mobile applications), pre-fetching and pre-calculations can be used to improve process execution Knowledge about the run-time characteristics of a process can include, e.g., the probability of accessing a state and/or task given the current state.

As noted above, where only the buyer can explicitly refresh local data, communication is not fully taken advantage of. By contrast, an automated process can guess what queries should be dispatched to the server and in what order. It can make use of processing power by running background computations. It can profit from the available connection time and resolve consistency conflicts and pre-fetch necessary data. One can take advantage of the context in older to automatically create and rank queries and benefit the management of data. In an e-commerce system, with clients accessing PDAs and being mobile and disconnected part of the time, efficient interaction with the marketplace server can be enabled The context as well as available resources such as limited connection and storage space can be taken into account. Thus, one or more embodiments of the invention can take advantage of ranked maintenance queries for mobile devices based on context. Note that one potential requirement of an e-commerce system is to consider the fact that frequent disconnections occur between mobile clients and the server One or more exemplary embodiments of the invention can be implemented in connection with web hosting software such as WEBSPHERE® software available from International Business Machines Corporation of Armonk, N.Y. Such software can enable definition, creation, merger, consolidation, and streamlining of processes using applications that run on a service-oriented architected IT infrastructure. Such software can include design and development tools, runtime servers, monitoring tools, toolkits, and process templates, and can be built on J2EE standard foundations. Using such software, processes can be monitored and analyzed. Events emitted by the process tasks can be received by the event bus and transmitted to the relevant monitoring or aggregator/correlation modules. Both of these use real-time local data as well as remote, historical data. As events are received, they are processed under limited time constraints. In order to speed up the access to remote databases data is often cached. The freshness of the cache is one pertinent parameter in the correctness of the results. Pre-fetching and pre-computation techniques of one or more embodiments of the invention can use the knowledge about the business process description and history and current state to prioritize caching decisions and optimize the freshness of the data.

Figure 2:
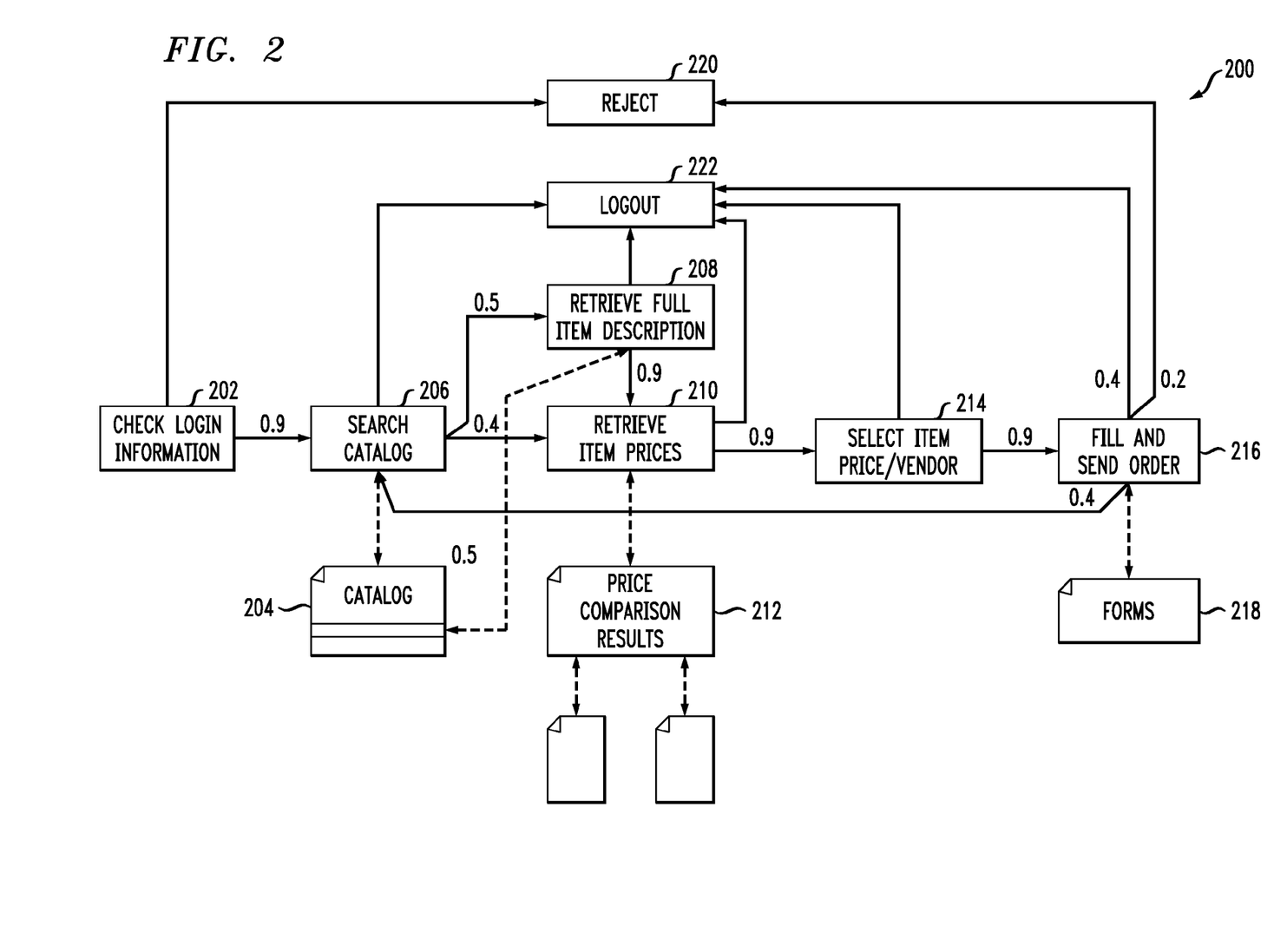
FIG. 2 is an example of a process where users can login, search through a catalog of items, use a price comparison engine, and buy items.

FIG. 2 shows an example of a process 200 where users can login at block 202, search through a catalog of items 204 as at block 206, use a price comparison engine as at blocks 208, 210, and 212, and buy items as at blocks 214 and 216. Forms 218 can be employed. Block 220 shows a rejected login or order and block 222 indicates logout. Queries can be parameterized The queries can be pre-written but not instantiated. For example, a search would contain a parameter in the "WHERE" clause that is filled in after the user enters the search key. Process descriptions can be annotated (in web software described above, for example) with expected timings for each task, as well as the probability of accessing one task from another task. All probabilities on the transitions going out of a task should add up to 1 Timings and probabilities can also be calculated by averaging over historical run-time instances. The probability of transitions is noted on the edges of the graph. Assume, e.g., that the current state is the task that searches through the catalog. The user already entered the search key I, which gives the parameter of the query. Then, given the current state, the probability to search for I is (0.4+0.5×0.9)=0.85.

Note that for illustrative clarity a self-loop on the current task that would entail changing the key was not included. The existence of a probability there would change the remaining probabilities The results of queries can be cached In order to quantify the need for pre-fetching a certain query, one can make use of the probability that the query is needed, the confidence on the query parameter, the size of the answer, and/or the expected time that remains until the query is needed. In view of the foregoing, it will be appreciated that pre-fetching techniques should be able to ascertain whether an artifact is worth caching and what the priority of the artifact for caching is.

A way to create and maintain queries and their associated metadata (probabilities, etc.) is advantageous. One can employ, e.g., a graph structure where nodes are queries and edges represent dependencies between the corresponding states where these queries are accessed, although other structures that give the same or similar information can be used as well. In order to provide the information needed, the modules in FIG. 3 can be used. Their dependencies are also depicted.

Figure 3:
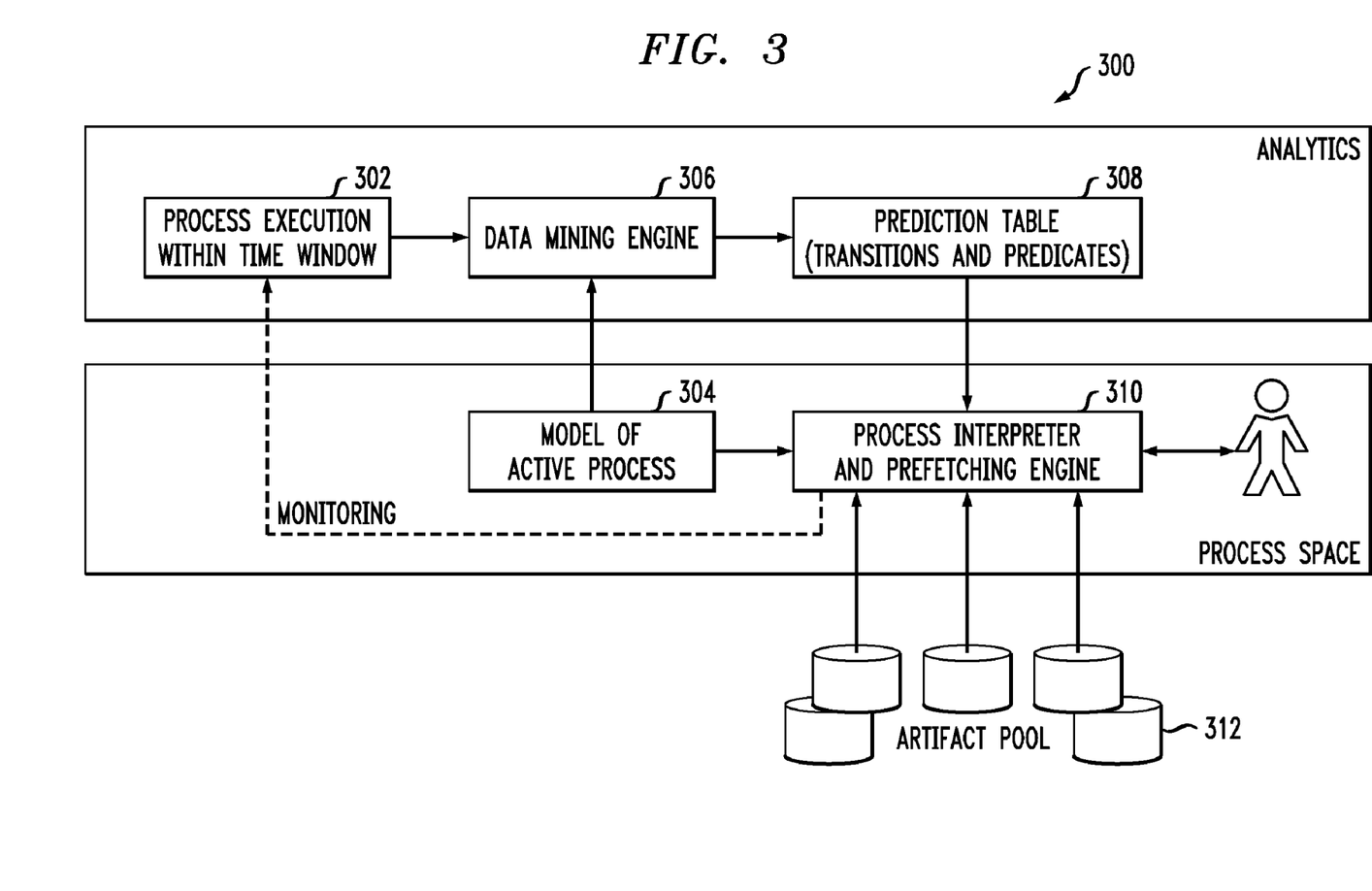
FIG. 3 shows an exemplary apparatus for enabling execution of a process, according to another aspect of the invention.

Thus, it will be appreciated that FIG. 3 shows an exemplary embodiment of an apparatus for enabling execution of a process, according to one aspect of the invention. Apparatus 300 can include a process module configured to maintain current state information. The process module can be formed, for example, by a process execution time engine 302 and an active process model 304. Apparatus 300 can also include a data mining engine 306 coupled to the process module to obtain historical data therefrom. When the process module includes the aforementioned engine 302 and model 304, each can be coupled to the data mining engine 306.

Apparatus 300 can also include a prediction module, such as prediction table 308, coupled to the data mining engine 306 to obtain query data therefrom. The table 308 can be configured to maintain priority metadata. A process interpreter and prefetching engine 310 can also be included and can be coupled to the process module and the prediction module to obtain prioritization knowledge therefrom, and further, can be configured to time and send queries based on the prioritization knowledge.

The active process model 304 can be configured to coordinate a run-time of the process The process execution time engine 302 can be coupled to the process interpreter and prefetching engine 310 for monitoring. A business artifact pool 312 can be configured for input to the process interpreter and prefetching engine 310. The query data from the data mining engine 306 can include access probability, query confidence data, task timing data, and query timing data. The query timing data can be based on query semantic knowledge and expected query selectivity.

Thus, the process execution time engine 302 can maintain information on the current state and the remaining business process from the model of the active process 304 (which can be, in essence, the "choreographer" that is used to coordinate the run-time of the process(es)). The data mining engine 306 can keep track of history, and derive one or more of the following: probability of accesses, confidence on query parameters, timing for tasks, and timing for queries, based on knowledge about the query semantics and expected selectivity from previous similar queries.

Further, the prediction table 308 can maintain the queries and the metadata on priorities, and the interpreter and prefetching engine 310 can decide on what queries are sent and when to send them. It can use knowledge from the other modules to prioritize and compare the benefit with a threshold for the decision Given, e.g., an instantiated structure for maintaining queries, parameters entered by the user, and the current state of the business process, the prefetching engine can assign priorities to all prefetch queries upon a change of state or entering of a new parameter Creating Queries The ordering, dispatch and maintenance of two types of queries can be facilitated: user-initiated and background queries. For simplicity we will refer to them as UQueries and BQueries respectively. Queries explicitly initiated by users, UQueries, can be defined either over local or over remote server data. By contrast, BQueries typically always require access to the base data tables on the server. We differentiate between them explicitly to emphasize the set of remote prefetch queries which are BQueries Note that the user queries UQueries have the query parameters instantiated explicitly by the user, while BQueries learn predicates from UQueries and other BQueries. The dependency between parameters of UQueries and BQueries can be explicit (same parameter name) or can be inferred statistically with a calculated confidence measure At any point, the construction of queries to be prioritized may be dependent on the current workflow state as well as on the schema of the table accessed. Local data tables are sections of the corresponding base tables on the server. That is, a local table (LocalTable) with LocalTableID is derived from a single base table (BaseTable) according to a {SELECT*FROM BaseTableID} query (in, e.g., SQL language). The limitations on cache size impose that local tables are reduced in size by additional conditions such as a WHERE clause appended to the initial SELECT clause, or define a set of attributes in the SELECT clause to replace "*" This mapping between local and remote data tables should be stored in a directory for quick access. A buyer using the mobile device can dispatch either local or remote UQueries. These queries are easily constructed by appending the WHERE clause specific to the action being performed to the SELECT statement over local data, or the corresponding SELECT statement in the mapping directory for remote data.

By way of an example, let a user access local tables MemberProfile and Session ({states}), scan the ID of an item and locally access the Product table. The user query is constructed by appending {WHERE ProductId=ID} to the basic SELECT statement over the table: {SELECT*FROM Product WHERE ProductId=ID} A connection is open with the server, and the device dispatches the query that retrieves the listing of products corresponding to the id. The BQueries that depend on the parameter of the user query can be instantiated.

Based on their use, we can distinguish between three types of queries that can be dispatched to the server:

1. queries explicitly dispatched by a user (UQueries). UQueries are the queries that a buyer constructs when requesting an access to the server data Note that the connection to the server may be delayed, and a set of UQueries can be pending. UQueries should typically be given first priority on connection, maintaining the order in which they were dispatched.
2. refresh queries (BQueries). A user can request access to local data instead of server data In this case, there is a chance that the buyer views out-of-date information as compared to the state of the data on the server. In order to improve the freshness of the local data, each local UQuery_i will have a corresponding BQuery_i(UQuery_i) created. These types of background queries should typically not take priority over user-initiated queries. Data is refreshed when receiving the answer to BQuery_i(UQuery_i).

3. pre-fetch queries (BQueries). According to the current state of user interaction with data tables, there is a high probability that the user will also access the tables referenced in states immediately following the current state. The system can attempt to refresh this data prior to user access, by constructing pre-fetch queries BQuery_j. It is important to note that the construction of pre-fetch queries is not always possible. This is the case when the WHERE clause of the current user query can be applied to the tables accessed by the child nodes. Since communication bandwidth is restrictive, these tables should typically not be entirely replicated locally, without explicit user intervention. Again, as background queries, pre-fetch queries do not take priority over user-initiated queries.

The probability of a user accessing the results of a pre-fetch query is typically greater than that of accessing the results of a refresh query. Heuristics can take into account paths of more than one edge in building pre-fetch queries Prioritizing Queries The prioritization can be done by the Prioritize( ) function (inside the Process Interpreter and Caching (prefetching) engine). Continuously instantiated BQueries come in, with the following annotation:

1. confidence that the instantiation parameter is correct, P(key)
2. the probability of each query q to be used, P(q). (Prioritize( ) has to dynamically adjust its decisions, based on information coming in.)
3. the expected time T(q) until q would become an explicit user query. T(q) is calculated using the expected time of each task on the path from the current task to the task containing q and the time of communication between tasks One possible instantiation of Prioritize( ) is the following:

instantiate a data structure (heap) that stores all BQueries in order of priority number.

A thread runs continuously and selects the top of the heap (highest priority query), and dispatches the query When a query is returned or if the next query is independent to the currently running ones, the thread selects the next top of the heap query.

New BQueries come in as input With each query, Prioritize( ) recalculates the priorities of all queries and reorders them accordingly.

Recall the above discussion of steps 116-120 within step 114.

The assignment of priorities is a pertinent part of Prioritize( ). It takes as input P(key), P(q) and T(q) for each incoming BQuery and assigns priority for all BQueries A possible instantiation is [P(key)×P(q)]/T(q)]. Since the order of prioritization may remain the same for some time (although the actual priority numbers change), optimizations can be applied to the query data structure and avoid frequent reconfiguration. Recall, the process can facilitate user-initiated queries, refresh background queries, and prefetch background queries. The above-discussed step 112 of determining the benefit can include, e.g., assigning priority for incoming ones of the refresh background queries and the prefetch background queries.

One or more embodiments of the invention can provide a framework that refreshes local data by initiating and ranking background queries. Automatically generated queries can be submitted to the server in addition to the queries explicitly required by buyers. Automatically generated queries can be prioritized according to their usefulness in a given context, and dispatched to the server without interfering with user-initiated queries. This approach can facilitate pre-fetching. Otherwise, the pre-fetch of data would have to be increasingly user-dependent or would require the periodic interference of a consistency resolution mechanism and subsequent interruption of user actions.

Figure 4:
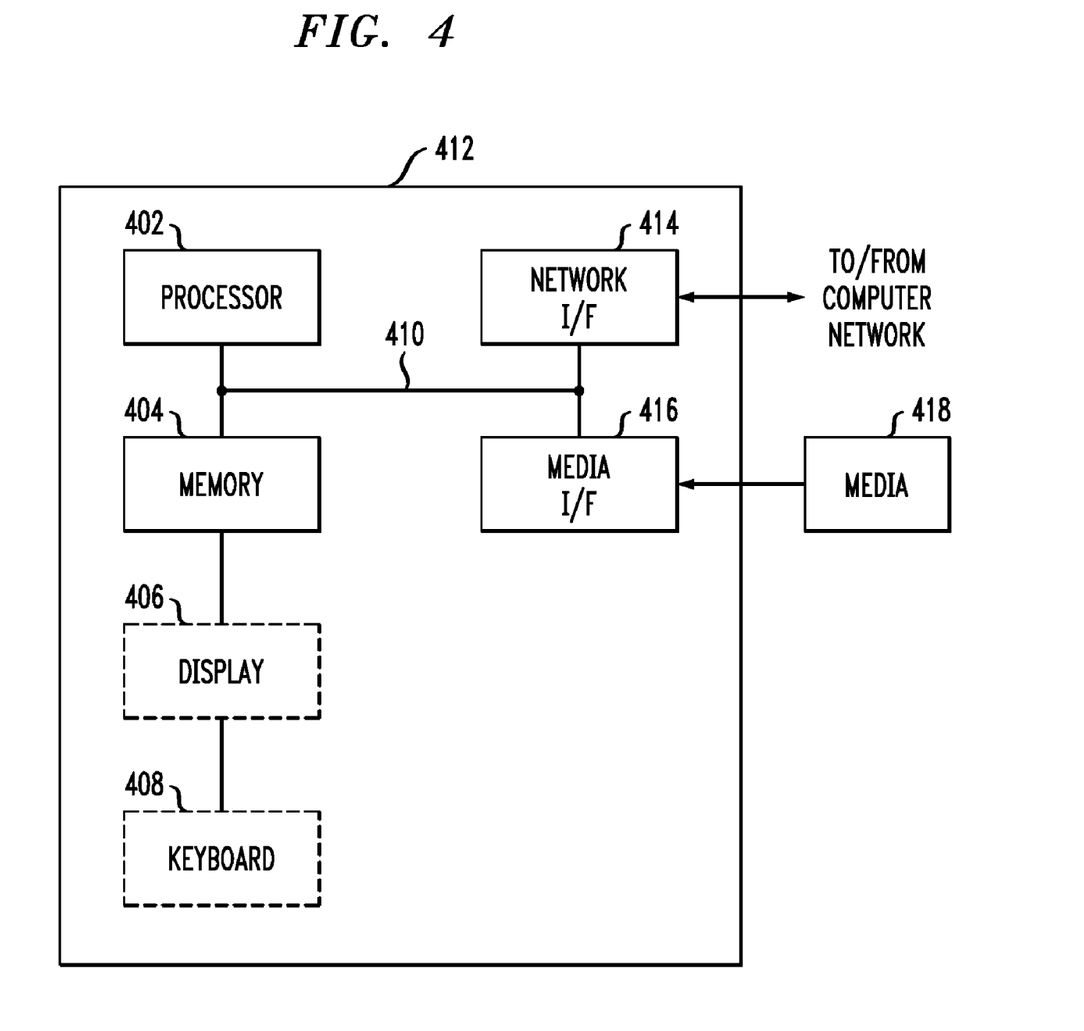
FIG. 4 depicts a computer system that may be useful in implementing one or more aspects and/or elements of the present invention.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated furthermore, one or more embodiments of the invention can be implemented in the form of an apparatus including a memory and at least one processor that is coupled to the memory and operative to perform exemplary method steps At present, it is believed that the preferred implementation will make substantial use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to inter face with media 418.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium Examples of a computer-readable medium include a semiconductor or solid-state memory (e.g. memory 404), magnetic tape, a removable computer diskette (e.g. media 418), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or mole appropriately programmed general purpose digital computers with associated memory, and the like. Given the teachings of the invention provided herein, one of ordinary skill in the related art will be able to contemplate other implementations of the components of the invention Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for enabling execution of a process employing a cache, comprising:
    obtaining a first probability of accessing a given artifact in a state $S_i$ of a next step in said process;
    obtaining a second probability of using a predicate from a current state $S_c$ of a current step in said process for said next step in said process in said state $S_i$;
    determining a benefit of prefetching said given artifact using said predicate based on at least said first probability and said second probability; and
    evaluating at least one of:
    (i) whether and
    (ii) when a cache replacement should be conducted for the cache, based at least on said benefit determined in said step of determining said benefit.

2. The method of claim 1, wherein:
    said obtaining of said first and second probabilities is conducted to yield additional artifacts that are candidates for prefetching;
    said step of determining said benefit of prefetching includes determining additional benefits for said additional artifacts; and
    said evaluating step is based at least on said additional benefits.

3. The method of claim 2, wherein said evaluating step is further based at least on an approximate time until execution.

4. The method of claim 2, wherein said evaluating step is further based at least on a retrieval cost.

5. The method of claim 2, wherein said step of obtaining said first probability comprises estimating said first probability based on at least one of knowledge of said current state $S_c$ and knowledge of structure of the process.

6. The method of claim 5, wherein said step of obtaining said first probability further comprises estimating said first probability based on knowledge of past traces of the process.

7. The method of claim 2, wherein said step of obtaining said second probability comprises:
    calculating correlations between a plurality of predicates in a plurality of different states, said predicate from said current state $S_c$ being one of said plurality of predicates, said current state $S_c$ and said state $S_i$ being ones of said plurality of different states, said calculation being based on stored past traces of the process; and
    estimating said second probability of using said predicate from said current state $S_c$ in said state $S_i$, said estimating being based on said correlations from said step of calculating said correlations.

8. The method of claim 2, wherein:
    the process facilitates user-initiated queries, refresh background queries, and prefetch background queries; and
    said step of determining said benefit comprises at least assigning priority for incoming ones of said refresh background queries and said prefetch background queries.

9. The method of claim 8, wherein said evaluating step comprises:
    instantiating a data structure that stores said refresh background queries and said prefetch background queries in priority, each of said refresh background queries and said prefetch background queries having a priority number;
    running a thread to select a highest priority one of said refresh background queries and said prefetch background queries; and
    responsive to receipt of an input query, recalculating said priorities of said refresh background queries and said prefetch background queries and reordering said refresh background queries and said prefetch background queries in accordance with said recalculating.

10. The method of claim 9, wherein said user-initiated queries are assigned a higher priority than said refresh background queries and said prefetch background queries.

11. An apparatus for enabling execution of a process, comprising:
    a process module configured to maintain current state information;
    a data mining engine coupled to said process module to obtain historical data therefrom;
    a prediction module coupled to said data mining engine to obtain query data therefrom; and
    a process interpreter and prefetching engine coupled to said process module and said prediction module to obtain prioritization knowledge therefrom and configured to time and send queries based on said prioritization knowledge.

12. The apparatus of claim 11, wherein said process module comprises a process execution time engine and an active process model, each coupled to said data mining engine.

13. The apparatus of claim 12, wherein said active process model is configured to coordinate a run-time of the process.

14. The apparatus of claim 13, wherein said process execution time engine is coupled to said process interpreter and prefetching engine for monitoring.

15. The apparatus of claim 14, further comprising a business artifact pool configured for input to said process interpreter and prefetching engine.

16. The apparatus of claim 11, wherein said query data from said data mining engine comprises access probability, query confidence data, task timing data, and query timing data.

17. The apparatus of claim 16, wherein said query timing data is based on query semantic knowledge and expected query selectivity.

18. The apparatus of claim 11, wherein said prediction module comprises a prediction table configured to maintain priority metadata.

19. A computer program product comprising a computer useable storage medium having computer useable program code for enabling execution of a process employing a cache, said computer program product including:
 computer useable program code for obtaining a first probability of accessing a given artifact in a state $S_i$ of a next step in said process;
 computer useable program code for obtaining a second probability of using a predicate from a current state $S_c$ of a current step in said process for said next step in said process in said state $S_i$;
 computer useable program code for determining a benefit of prefetching said given artifact using said predicate based on at least said first probability and said second probability; and
 computer useable program code for evaluating at least one of:
 (i) whether and
 (ii) when a cache replacement should be conducted for the cache, based at least on said benefit prefetching said artifact.

20. An apparatus for enabling execution of a process employing a cache, comprising:
 a memory; and
 at least one processor coupled to said memory and operative to:
 obtain a first probability of accessing a given artifact in a state $S_i$ of a next step in said process;
 obtain a second probability of using a predicate from a current state $S_c$ of a current step in said process for said next step in said process in said state $S_i$;
 determine a benefit of prefetching said given artifact using said predicate based on at least said first probability and said second probability; and
 evaluate at least one of:
 (i) whether and
 (ii) when a cache replacement should be conducted for the cache, based at least on said benefit of prefetching said artifact.

* * * * *